Jan. 10, 1933.  N. S. BORTNER  1,893,793
PERIMETER DELINEATOR
Filed Dec. 2, 1931

INVENTOR.
N. S. Bortner
BY
Thomas W. J. Clark
ATTORNEY.

Patented Jan. 10, 1933

1,893,793

UNITED STATES PATENT OFFICE

NORMAN S. BORTNER, OF BALTIMORE, MARYLAND

PERIMETER DELINEATOR

Application filed December 2, 1931. Serial No. 578,540.

My invention relates to improvements in a wire cross-section perimeter delineator, sometimes called a wire-o-graph; and the objects of my improvements are to hold the wire more firmly and accurately, to greatly increase the accuracy of the device by the use of a single, adjustable lever, to make the marker lever resilient and to make it possible to use a whole chart with a face free to the view of the operator, except for the marker arm.

Figure 1:
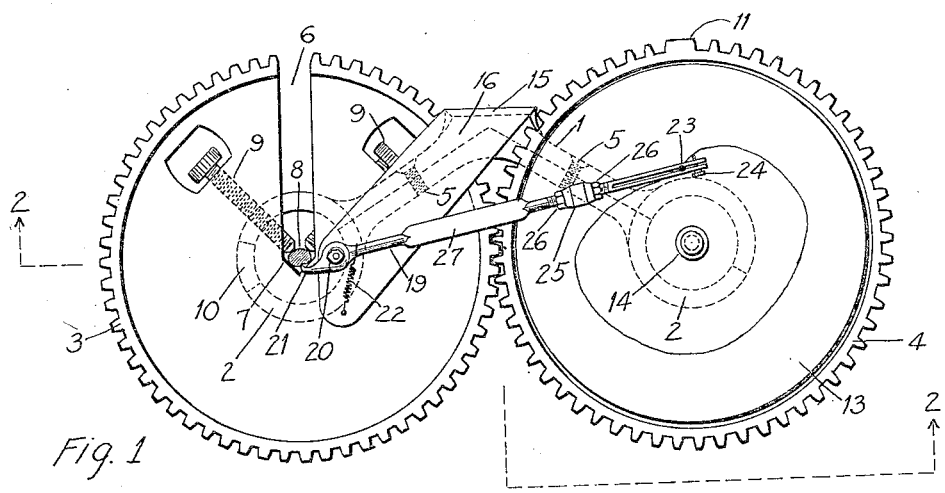

I attain these and other objects and advantages, which will be apparent as the description proceeds, by the mechanism illustrated in the accompanying drawing; in which Fig. 1 is a plan view of the device in use.

Figure 2:
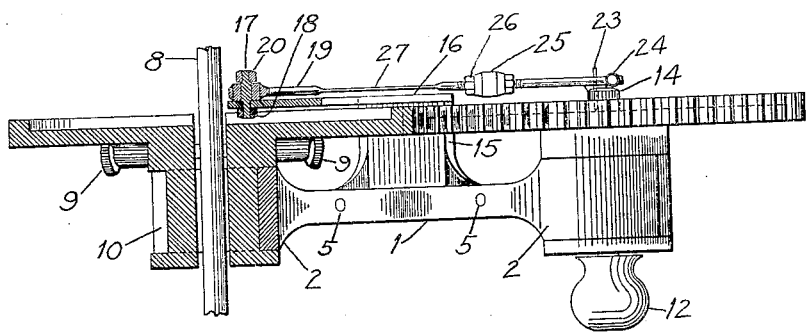

Fig. 2 is a partial sectional view on line 2—2 of Fig. 1.

Similar numerals refer to similar parts throughout the several views.

The device is primarily designed to get an enlarged view of the exact cross-section of a trolley wire. Views may be taken with an interval of time between and comparison made to determine the wear and probable life of the wire, or single views will indicate the strength of the wire.

A bowed split yoke 1 at its ends has collars 2 surrounding the journals of sun-gear 3 and planet-gear 4. The yoke is held together by screws 5. Gear 3 has a radial slot 6 with V-shape seat 7 so that the gear may be placed under a wire 8. Screws 9 accurately and firmly hold the gear on the wire. The collar 2 on the journal of gear 3 has a space between its ends, 10, so that when the gear 4 is hanging down, the space coincides with the slot 6 in the gear, and the gear may be placed from under around the wire. The gears are accurately cut to allow as little play as possible, and a double tooth 11, on gear 4 fits into slot 6, so the gears may always be assembled just the way they had been previously. Gear 4 has a knob 12 projecting from its journal by which it may be turned around gear 3. Gear 4 has on its face a chart 13 held in place by a collared thumb screw 14.

Yoke 2 has extending from its outer bowed side the upright 15, which is extended as a supporting arm 16 over gear 3 to near the center of the gear. This arm 16 has therein a pintle 17 with an enlarged central bearing surface and it is held rigidly by nut 18 on its inner end. Lever 19 is pivoted near its end on this pintle 17 and is held so that it may swing freely, by lock nut 20. The short end of lever 19 has a point 21 which approaches the wire axially of the wire so that wear on the point will not change the length of the short lever. A spring 22 holds the point in contact with the wire. The long end of the lever is split near its outer end and has a pencil 23 held fast by screw 24. The long end of the lever is in two sections, held together by turnbuckle 25 and lock nuts 26, one on each section, so that its length may be adjusted should the wear of point 21 cause it to come nearer the fulcrum of the lever. In this manner the device may be kept accurate in its proportion of enlargement.

Toward the center of the long end of lever 19 is a flattened section 27 which is resilient and is bent to give the proper friction to the pencil, and the flattened section also permits the pencil to be raised and removed from the chart. The gears have the same radius, and a complete revolution of gear 4 around gear 3, when the device is in place on the wire, will give a complete enlarged view of the perimeter of the cross-section of the wire.

Since a uniform practice of putting the device on the wire may be followed, and also a uniform practice of putting the charts on gear 4, it is possible to always know which part of the curve drawn represents the top and bottom of the wire.

Although, "wire", is used throughout this description and the claims, it is apparent that the device is equally useful in getting a cross-sectional view of any object that may be held while point 21 is drawn around it, and it is intended that "wire", shall include any other such article.

Many changes may be made in the device without departing from the spirit of my invention and I, therefore, intend to be limited only by the appended claims, and that in connection with the above conception of the word, "wire".

I claim as new and desire to secure by Letters Patent:

1. In a wire cross-section perimeter delineator, a sun-gear, means to hold a wire axially therein, a planet-gear adapted to rotate planet-like around said sun-gear and having thereon a chart, means to hold said gears together, a pivoted lever on said means, one end of which is adapted to rest against the side of said wire and the other end of which is adapted to delineate on said chart the perimeter of the wire cross-section upon a complete revolution of said planet-gear around said sun-gear.

2. In a wire cross-section perimeter delineator, a sun-gear, means to hold a wire axially therein, a planet-gear adapted to rotate planet-like around said sun-gear and having on one face thereof a chart, means to hold said gears together, a pivoted lever on said means one end of which is adapted to be resiliently held against the side of said wire and the other end of which has a marker adapted to delineate on said chart the perimeter of the wire cross-section upon a complete revolution of said planet-gear around said sun-gear, said lever being adjustable lengthwise from its pivot to its marker end.

3. In a wire cross-section perimeter delineator, a sun-gear, means to hold a wire axially therein, a planet-gear adapted to rotate planet-like around said sun-gear and having on one face thereof a chart, means to hold said gears together, a pivoted lever on said means one end of which is adapted to be resiliently held against the side of said wire and the other end of which has a marker adapted to delineate on said chart the perimeter of the wire cross-section upon a complete revolution of said planet-gear around said sun-gear, said lever being flexible perpendicularly to said chart and said marker being resiliently held against said chart.

4. In a wire cross-section perimeter delineator, a sun-gear, means to hold a wire axially therein, a planet-gear adapted to rotate planet-like around said sun-gear, a member to hold said gears together from one side thereof, an arm on said member projecting over the other side of said sun-gear, a pivoted lever on said arm, a chart on the side of the planet-gear opposite the holding member, one end of said lever being adapted to rest against the side of said wire and the other end being adapted to delineate on said chart the perimeter of the wire cross-section upon a complete revolution of said planet-gear around said sun-gear.

5. In a wire cross-section perimeter delineator, a sun-gear and a planet-gear of the same diameter, a member to hold said gears together from one side thereof, means to hold a wire axially in said sun-gear, an arm on said member projecting over the other side of said sun-gear, a lever pivoted on said arm near to the axis of said sun-gear, a chart on the side of said planet-gear opposite the holding member, said lever having a short end adapted to rest against the side of said wire and a long end adapted to delineate on said chart the enlarged perimeter of the wire cross-section upon a complete revolution of said planet-gear around said sun-gear.

NORMAN S. BORTNER.